United States Patent
Wang et al.

(10) Patent No.: US 7,110,676 B2
(45) Date of Patent: Sep. 19, 2006

(54) POWER PRE-EMPHASIS FOR WDM TRANSMISSION SYSTEMS

(75) Inventors: Weyl K. Wang, Marlboro, NJ (US); Glen P. Koste, Brewster, NY (US); Philip J. Lin, Newton, MA (US)

(73) Assignee: Tellabs Operations, Inc., Naperville, IL (US)

( * ) Notice: Subject to any disclaimer, the term of this patent is extended or adjusted under 35 U.S.C. 154(b) by 609 days.

(21) Appl. No.: 10/075,067

(22) Filed: Feb. 12, 2002

(65) Prior Publication Data

US 2003/0011853 A1    Jan. 16, 2003

Related U.S. Application Data

(60) Provisional application No. 60/268,441, filed on Feb. 13, 2001.

(51) Int. Cl.
   *H04J 14/02* (2006.01)
   *H04B 10/04* (2006.01)
   *H04B 10/12* (2006.01)

(52) U.S. Cl. .................. 398/94; 398/197; 398/79
(58) Field of Classification Search ............ 398/7, 398/34, 68, 79, 93, 94, 158, 192, 197, 95, 398/91–92, 1, 9
   See application file for complete search history.

(56) References Cited

U.S. PATENT DOCUMENTS

| | | | | |
|---|---|---|---|---|
| 5,225,922 A | * | 7/1993 | Chraplyvy et al. ........... 398/94 |
| 5,276,543 A | * | 1/1994 | Olshansky ................... 398/79 |
| 5,790,289 A | * | 8/1998 | Taga et al. .................. 398/79 |
| 6,091,869 A | * | 7/2000 | Sundelin ..................... 385/24 |
| 6,108,114 A | * | 8/2000 | Gilliland et al. ............ 398/195 |
| 6,341,021 B1 | * | 1/2002 | Wilner et al. ................ 398/79 |
| 6,445,471 B1 | * | 9/2002 | Shimokawa et al. .......... 398/79 |
| 6,654,561 B1 | * | 11/2003 | Terahara et al. .............. 398/26 |
| 6,674,557 B1 | * | 1/2004 | DaSilva et al. ............... 398/79 |
| 6,701,089 B1 | * | 3/2004 | Goodwin et al. ............. 398/79 |
| 6,900,932 B1 | * | 5/2005 | Chen et al. ............... 359/337.1 |

OTHER PUBLICATIONS

J. Zyskind, J. Nagel, and H. Kidorf, Chapter 2 Erbium-Doped Fiber Amplifiers for Optical Communications, in Optical Fiber Telecommunications IIIB (I. Kaminow and T. Koch ed., Academic Press, Dan Diego, 1997).*

* cited by examiner

*Primary Examiner*—Leslie Pascal
*Assistant Examiner*—Quan-Zhen Wang
(74) *Attorney, Agent, or Firm*—Welsh & Katz, Ltd.

(57) ABSTRACT

An optical network incorporates one of wavelength based or lightpath link based pre-emphasis to reduce the power fluctuation range at optical receivers in the network. Power output from channel transmitters can be varied on a per channel basis to minimize the effects of non-constant per-channel gain as a function of wavelength. Pre-emphasis circuitry coupled to the transmitters imposes an optical power profile on transmitter output in accordance with an inverse of the gain characteristic of network amplifier elements raised to an exponent which is equal to or less than the number of spans through which an optical signal is transmitted.

7 Claims, 4 Drawing Sheets

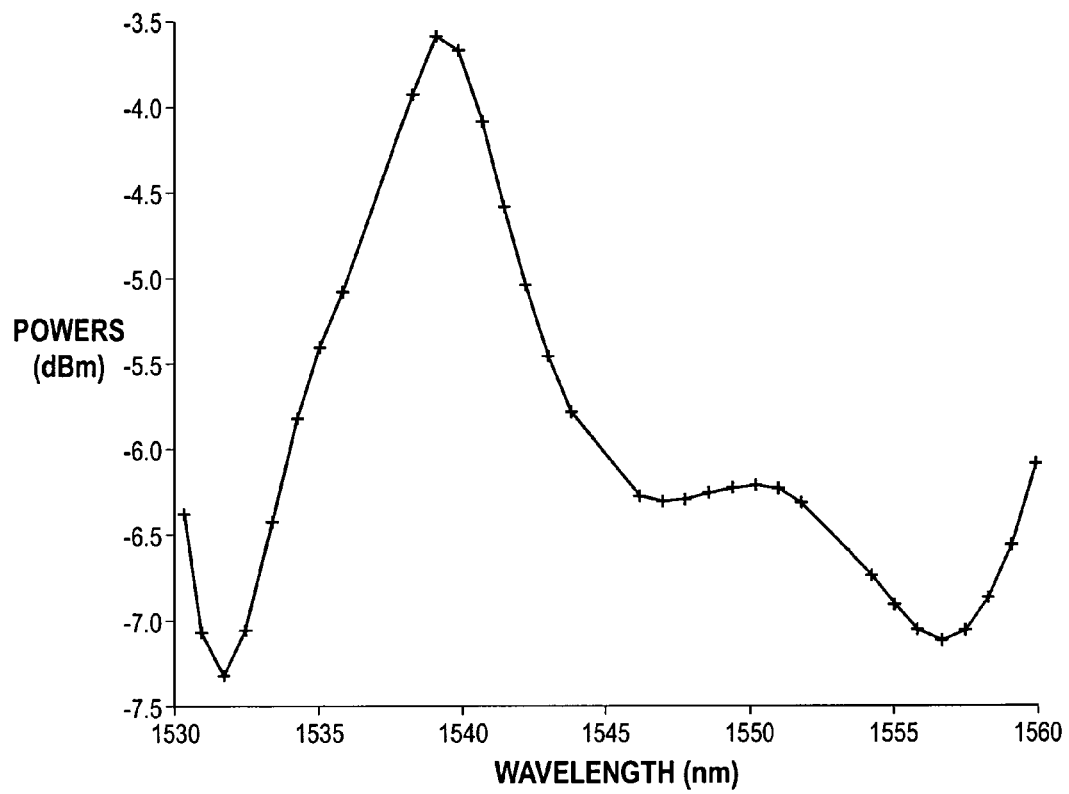
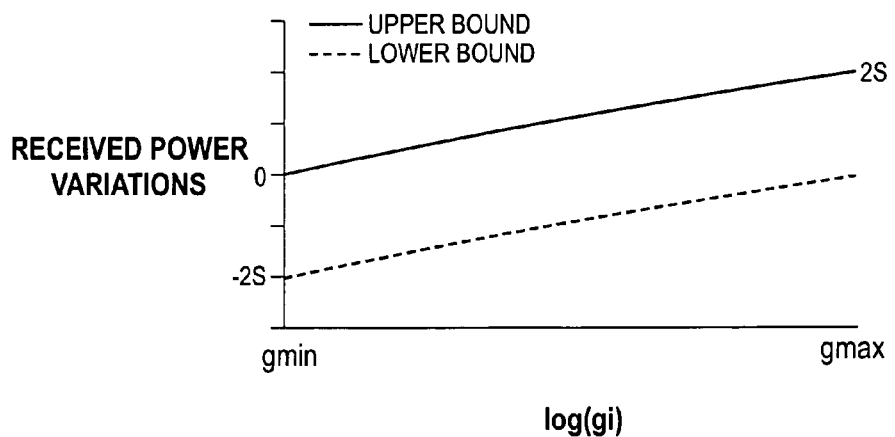

POWER PRE-EMPHASIS FOR WDM TRANSMISSION SYSTEMS

The benefit of a Feb. 13, 2001 filing date for Provisional Patent Application Ser. No. 60/268,441 is hereby claimed.

FIELD OF THE INVENTION

The invention pertains to optical networks. More particularly, the invention pertains to such networks wherein pre-emphasis circuitry is incorporated to reduce the input power fluctuation range required for network's receivers.

BACKGROUND OF THE INVENTION

Known optical communications networks incorporate a plurality of add/drop nodes or optical terminals which incorporate optical signal amplifiers. The terminals or nodes are interconnected by optical fibers.

A plurality of lasers can be used as transmitters to inject optical signals in parallel into respective receiving ends of optical fibers using a wavelength division multiplexing (WDM) protocol. Other forms of radiant energy transmitters can also be used.

FIG. 1 illustrates a portion of a known system 10. The add/drop nodes, or terminals 12a,b, include a power amplifier 14a, and a pre-amplifier 14b. Optical signals received at a terminal, for example from an up-stream span or optical fiber, such as 16a, which can incorporate a variable optical attenuator (VOA) 16a', are amplified at the terminal before being coupled to the next fiber optic span 16b. Such amplifiers, pre-amplifiers or power amplifiers, usually incorporate automatic gain control (AGC) circuitry to provide constant total optical power gain.

Although the AGC circuitry produces substantially constant total optical power gain, the system amplifiers introduce gain variations. With nominally identical power amplifiers, and pre-amplifiers each class of amplifier can be expected to exhibit a substantially identical variable gain profile over a wavelength range of interest, best seen, for example, in FIG. 2.

The variable amplifier gain profile for each pre-amplifier and power amplifier causes the actual per channel gain to vary according thereto. The input power profile will also vary, for example where the network is cross-connected. The overall gain experienced by a light path fluctuates as other light paths are set up and torn down in the network. This gain variation translates into light path power variation. The variation propagates from node to node. For example, with respect to FIG. 2, a channel having a wavelength on the order of 1532 nm will be amplified with maximum gain. On the other hand, a channel having a wavelength on the order of 1538 nm will be amplified with minimum gain in each amplifier, assuming that all amplifiers exhibit a similar profile.

As signals travel through the network, some of them will be amplified with a greater gain than others producing output signal power variations. In addition, the gains experienced by a light path will be altered by the set-up, tear-down or power fluctuations of other overlapping light paths in the network. Such variations are problematic in that the optical receivers have limited input sensitivity ranges. The larger the number of amplifiers that a set of channels passes through the greater will be the output power level variability. Too much input power will overload the respective receiver which in turn leads to increased error rates. This in turn limits the number of amplifiers through which a plurality of channels can pass.

With respect to AGC and variable gain profile, the gain on channel i can be represented as, $$g_i b(P_{in}),$$

where $g_i$ is the relative gain factor associated with the non-flatness of the amplifiers and $b(P_{in})$ is a "normalizing function" due to the AGC. As explained below, $b(P_{in})$ indeed varies with the input power profile $P_{in}$.

The amplifier is gain controlled such that the total output power divided by the total input power is a constant, $G_{tot}$. Hence, $$G_{tot} = \frac{\sum_j g_j b(P_{in}) P_j}{\sum_j P_j}.$$

consequently, $b(P_{in})$ behaves as, $$b(P_{in}) = G_{tot} \frac{\sum_j P_j}{\sum_j g_j P_j}.$$

therefore, $b(P_{in})$, as well as the gain for each individual wavelength, varies with the input power profile.

The gain experienced by channel i through a span such as 16a can be represented as:

$$A_i = \frac{g_i' b' g_i'' b''}{L},$$

where b' and b" (argument omitted for brevity) depend on the power profile at the input of each perspective amplifier, and L is the total loss (including fiber loss, device loss, and VOA loss) through the span. Substituting the expressions for b' and b", $$A_i = \frac{G_{tot}' G_{tot}'' g_i' g_i''}{L} \frac{\sum_j P_j}{\sum_j g_j' P_j} \frac{\sum_j g_j' b' P_j}{\sum_j g_j'' g_j' b' P_j}$$

$$= \frac{G_{tot}' G_{tot}'' g_i' g_i''}{L} \frac{\sum_j P_j}{\sum_j g_j'' g_j' P_j}$$

$$= g_i \frac{G_{tot}}{L} \frac{\sum_j P_j}{\sum_j g_i P_j} = g_i b(P_{in}).$$

The above expression shows how the span can be represented by a single amplifier with gain factor g=g'g". Further, for exemplary purposes only and not limitation, the VOA can be adjusted such that $L=G_{tot}$. For a perfectly flat amplifier, every wavelength channel will experience unity gain. For exemplary purposes assume $L=G_{tot}=1$.

For a non-flat amplifier, the gain experienced by each channel depends on $g_i$. Furthermore, if the input power profile changes, then the normalizing factor also changes.

For a network that is cross-connected, the input power profile at the beginning of each span is unpredictable. Therefore, the overall gain experienced by a light path fluctuates as other light paths are set up and torn down in the network. The amount of gain variation however is bounded.

The normalizing factor $b(P_{in})$ can be upper-bounded by replacing all $g_i$ with the minimum value, $g_{min}$, in the expression for $b(P_{in})$, $$b_{max} \le b(P_{in})|_{g_i=g_{min}} = \frac{\sum_j P_j}{\sum_j g_{min} P_j} = \frac{1}{g_{min}}.$$

This maximum is achieved when the input power is dominated by the channel with gain factor $g_{mm}$. Although the channel associated with $g_{min}$ is often the weakest channel, it is possible in a cross-connected network to have that channel dominate at the input of an amplifier.

Similarly, the minimum occurs when the input power is dominated by the channel associated with $g_{max}$, the channel with the largest gain, $$b_{min} \ge b(P_{in})|_{g_i=g_{max}} = \frac{\sum_j P_j}{\sum_j g_{max} P_j} = \frac{1}{g_{max}}.$$

This implies that the worst case variation in $b(P_{in})$ is bounded by the variation in $g_j$, regardless of the network configuration, traffic mix, light path routes, and input power profile.

Where the amplifiers exhibit gain variations as in FIG. 2, variation per span can be expected to be on the order of plus or minus 1 dB. This bound remains in effect even when light paths are dynamically added and dropped at various places in the network. This bound promotes network stability as each light path traverses a finite number of spans. As a result, the power variation at the receiver will also be bounded.

While such power variations may be bounded, they can exceed the input sensitivity of system receivers. In addition, there are times where light paths need to be added to an existing network which can also produce output signals which exceed receiver sensitivity.

There thus continues to be a need for communications networks which can compensate for amplifier gain variations thereby reducing input power fluctuation at the receivers. Preferably such compensation circuitry will be substantially transparent with respect to transmitted messages and will be implementable with minimal impact on manufacturing costs as well as on system reliability.

SUMMARY OF THE INVENTION

Optical networks can incorporate a power pre-emphasis process which minimizes the power fluctuation range at the network's receivers across a predetermined range of wavelengths. The output power of a selected channel is set according to the pre-emphasis process. Circuitry which implements the pre-emphasis process can be set, on a per-channel basis, at manufacture and when combined with a plurality of transmitters can be provided as a module installable in a network without needing further adjustment.

A given module can be used in conjunction with a variable number of optical spans, for example 4 to 8, with the assurance that the input power variation at receivers coupled to the respective spans will not exceed the respective receiver's sensitivity range. Alternately, the power profile of the transmitters established by the pre-emphasis circuits can be dynamically altered in response to changing network architecture.

In another embodiment, transmitter outputs can be coupled to a settable optical attenuator to implement a pre-emphasis function. It will be understood that while lasers can be used as transmitters on a per-channel basis that other forms of optical transmitters come within the spirit and scope of the invention.

A method that embodies the invention includes the steps of:

establishing a gain profile, across a range of wavelengths, on a per span basis;

forming an inverse of the gain profile;

establishing the widest acceptable receiver input power variation and determining a maximum number of allowable cascaded spans;

raising the inverse of the gain profile to an exponent which corresponds to the maximum allowable number of spans to form a processed inverse profile; and setting one of laser output power or optical filter characteristic, on a per-channel basis, in accordance with the processed inverse profile.

In yet another embodiment, networks can be formed of a plurality of substantially identical preset transmitter modules which can be coupled to up to a predetermined maximum number of cascaded spans. The preset transmitter modules provide assurance that the downstream optical receivers receive signals from the network which do not exceed their respective input sensitivity ranges. Thus, no field adjustments or settings are necessary. Paths can be added to a network with up to the selected maximum number of spans without further adjustments to the pre-emphasis circuitry.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 4 is a graph of inverse gain profile raised to a pre-emphasis factor of 2;

FIG. 5 is a graph of expected received power variations, as a function of gain variation;

DETAILED DESCRIPTION

Figure 1:
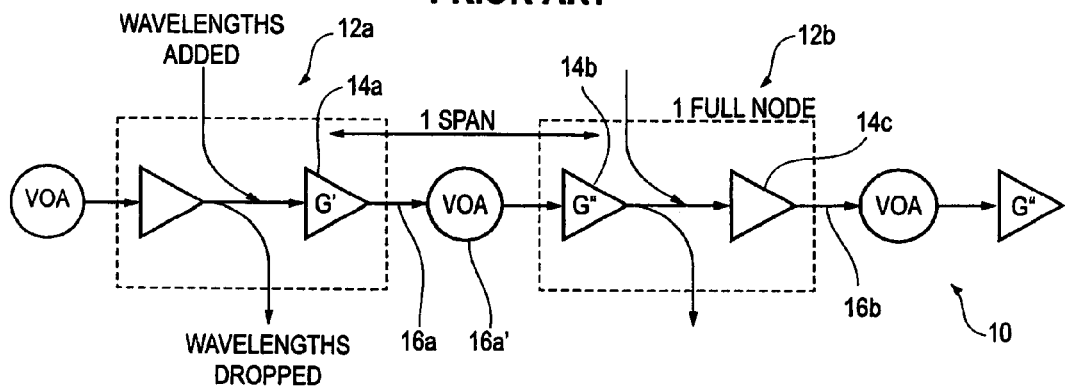
FIG. 1 is a block diagram of a portion of a prior art network.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Figure 3:
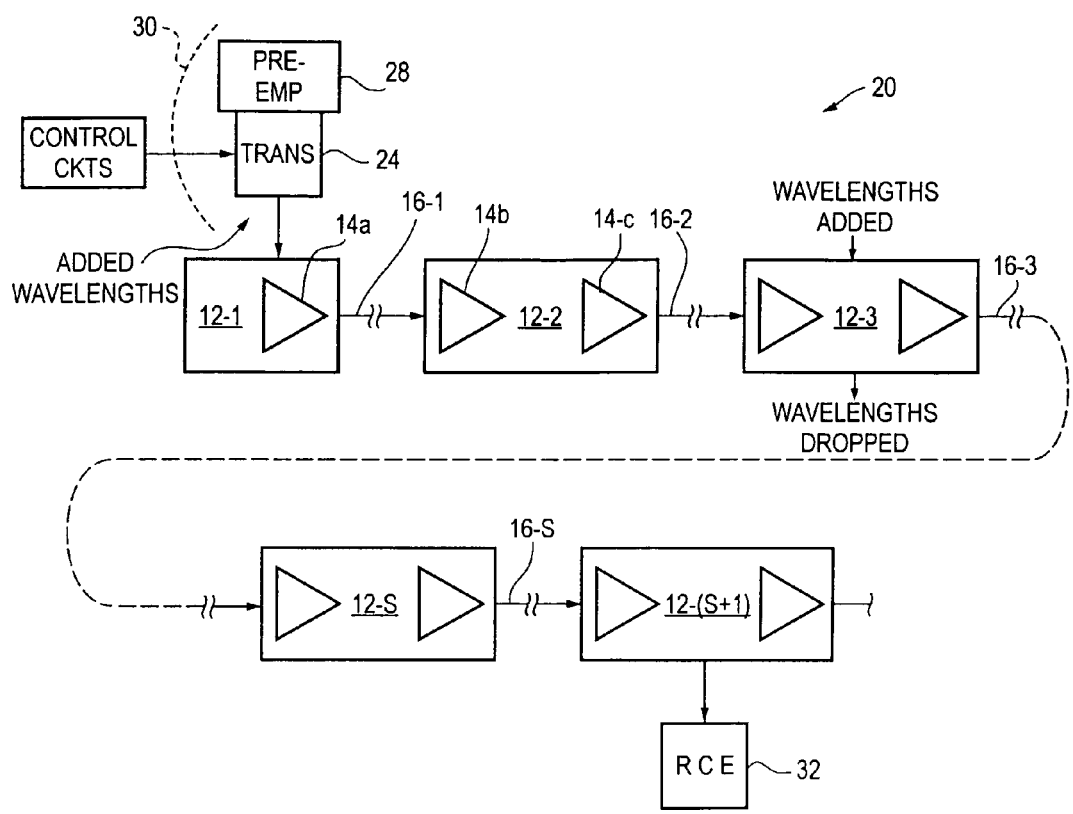
FIG. 3 is a block diagram of a portion of a network in accordance with the present invention.

FIG. 3 illustrates a portion of a network 20 in accordance with the invention. Elements 12-$i$ correspond to terminals such as 12$a$. The network 20 includes a plurality of S optical transmitting spans, or fibers 16-1,-2, -3 . . . -S. These spans form an optical path S spans long. It will be understood that network 20 may have numerous additional branches or spans, and terminals. The portion of the network 20 illustrated is sufficient to enable those of skill in the art to practice the invention and is sufficient to disclose the best mode of practicing the invention.

Figure 2:
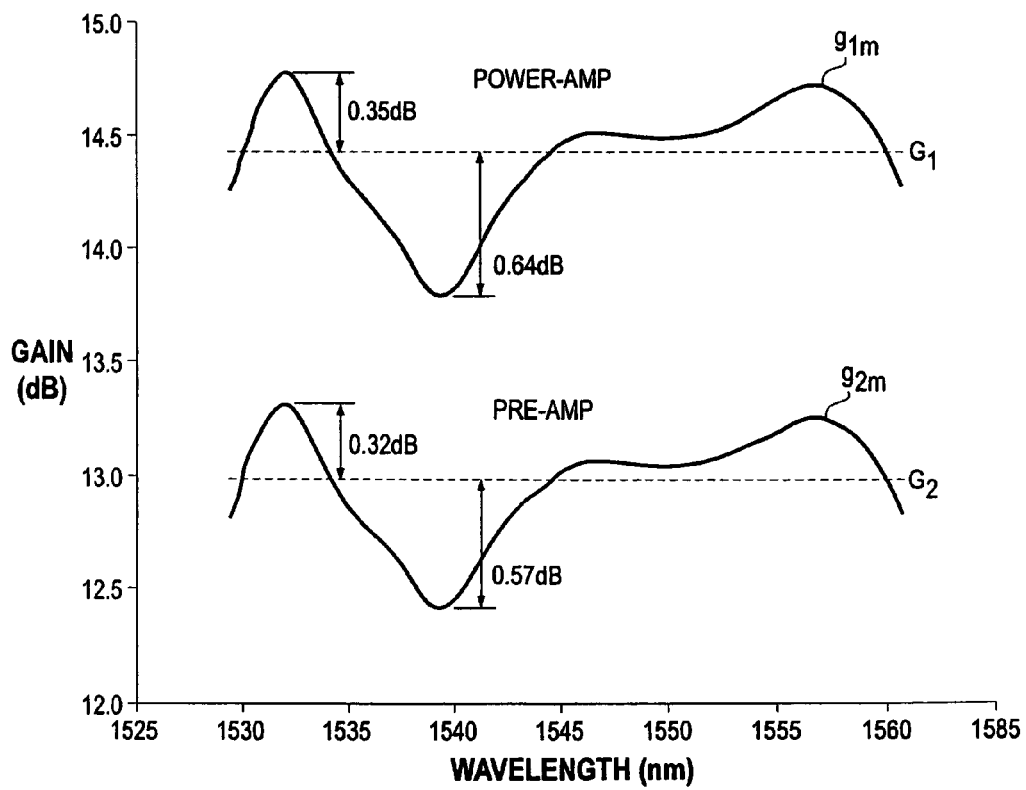
FIG. 2 illustrates gain profiles as a function of wavelength for the amplifiers of the network of FIG. 1.

As will be understood by those of skill in the art, the gain elements 14$a$,$b$ associated with a respective span, such as span 16-1, will exhibit representative gain profiles as illustrated in FIG. 2. Such gain elements can be represented as a single composite gain element with respect to signals transmitted through a respective span, such as span 16-1.

System 20 also incorporates a plurality of transmitters 24, one for each channel being added at terminal 12-1. The transmitters, which could be implemented as a plurality of lasers or laser diodes, operate or are driven in accordance with control signals from control circuits 26.

The output power profile for the plurality of transmitters 24 is established, on a per-channel basis, using pre-emphasis circuits 28. Circuits 28 can be set at manufacture. The combination of circuits 28 and transmitters 24 can be configured as one of a plurality of modules 30 installable in optical networks, such as network 20. As discussed in more detail subsequently, no field adjustments are necessary when adding a transmitter/pre-emphasis module, such as module 30 to a network such as network 20.

Those of skill in the art will understand that other transmitter pre-emphasis modules can be added at any point in the network without departing from the spirit and scope of the invention. Similarly, and without limitation, wavelengths can be added or dropped from the network at any terminal. Other network configurations can also be used with the present pre-emphasis process. In accordance with the above discussion, no adjustment or changes need be made to the modules, such as the module 30, notwithstanding the above variations.

In order to minimize gain variations, due to amplifier variations, as illustrated in FIG. 2, pre-emphasis circuits 28 set the output power profile of transmitters 24 in accordance with the inverse of the common, composite gain profile of the amplifiers associated with the spans 16-1,-2,-3, . . . -S raised to a predetermined exponent. For example, and without limitation, where S equals 2, there are two composite gain elements between module 30 and receiver 32. Where S equals 4, there are four composite gain elements in the four spans.

FIG. 4 is an exemplary, composite plot of the inverse of the gain profile of a composite gain element which incorporates a power amplifier, such as 14$a$, and a preamplifier, such as 14$b$ (having gain profiles as in FIG. 2) raised to the power of 2. Where the pre-emphasis circuits 28 are adjusted in accordance with the profile of FIG. 4, gain variations, which otherwise multiply as signals travel through respective spans, S1, S2 of the network 20 can be eliminated.

Similarly, where the value of S equals 4, pre-emphasis circuitry 28 can be set such that the power output profile of transmitters 24, on a per-channel basis, corresponds to the inverse of the composite gain profile raised to the fourth power. Once again, gain variations due to amplifier gain profiles can be minimized or eliminated in up to four spans.

In accordance with the above, we assume that the network is designed such that the amplifier model is the same from span to span. The following discussion is exemplary and illustrates additional characteristics of network 20. The power received after a light path has traversed S spans on wavelength channel i is, $$P_{out}(i) = P_{in}(i) \prod_{k=1}^{S} [g_i b(P_{in,k})].$$

Applying the bounds for b($P_{in}$), we have, $$P_{in}(i) \left[\frac{g_i}{g_{max}}\right]^S \le P_{out}(i) \le P_{in}(i) \left[\frac{g_i}{g_{min}}\right]^S.$$

Hence, the received power variation is bounded by the above limits. Note that the limits are functions of $P_{in}(i)$ and $g_i$.

Let $P_{tar}$ be the targeted power level, and let $\Delta P_{db}(i)$ be the amount $P_{out}$ is away from the target value measured in dB. Then $$10\log\left[\frac{P_{in}(i)}{P_{tar}}\right] + S10\log\left[\frac{g_i}{g_{max}}\right] \le \Delta P_{db}(i) \le 10\log\left[\frac{P_{in}(i)}{P_{tar}}\right] + S10\log\left[\frac{g_i}{g_{min}}\right].$$

If we were to ignore amplifier gain non-flatness, we would set $P_{in}(i)=P_{tar}$, with this setting of $P_{in}(i)$, we have, $$S10\log\left[\frac{g_i}{g_{max}}\right] \le \Delta P_{db}(i) \le S10\log\left[\frac{g_i}{g_{min}}\right].$$

We assume there is a 2 dB difference between $g_{max}$ and $g_{min}$. FIG. 5 is a plot the upper and lower bounds for $\Delta P_{db}(i)$ as a function of $g_i$.

Therefore, the received power variation is limited as a function of number of spans, S, in the light path. Specifically, the power difference away from target is limited to ±2S dB. This corresponds to an overall range of 4S dB. (If the variation in $g_i$ is $\delta$ dB, then the received power variation is ±2 $\delta$S dB.) Note that although the network as a whole has a 4S dB range, each individual channel varies within a 2S dB range. Hence, with appropriate pre-emphasis, the network-wide power variation range can be further reduced.

The pre-emphasis circuitry 28 adjusts the input power so the received power range becomes less dependent on $g_i$. As illustrated in FIG. 5, pre-emphasis should be inversely proportional to $g_i$ i.e., de-emphasizing the strong channels and emphasizing the weak ones. Preferably, the pre-emphasis circuitry 28 will tilt the graph of FIG. 5 to remove the dependence on $g_i$. We will use the following input power values for pre-emphasis:

$$p_{in}(i) = \left[\frac{10^{0.1 g_{min}}}{g_i}\right]^f P_{tar} = \left[\frac{10^{-0.1 g_{max}}}{g_i}\right]^f P_{tar},$$

where f is called the pre-emphasis factor. The second equality of the above equation comes from the fact that $g_{min}$ and $g_{max}$ differs by 2 dB. The factor f controls how much tilt is applied to the power variation plot. With the above pre-emphasis, the output power variation is then bounded by, $$-f + (S-f)10\log\left[\frac{g_i}{g_{max}}\right] \leq \Delta P_{db}(i) \leq f + (S-f)10\log\left[\frac{g_i}{g_{min}}\right].$$

For a light path covering S spans, the optimal pre-emphasis factor f that will produce the smallest range for $\Delta P_{db}(i)$ is f=S. However, within a network, the number of spans traversed differs from light path to light path. In one embodiment, pre-emphasis can be based on wavelength only and not on the light path length. Wavelength based pre-emphasis involves fixedly setting the transmitters in module 30 at the correct operating power.

Figure 6:
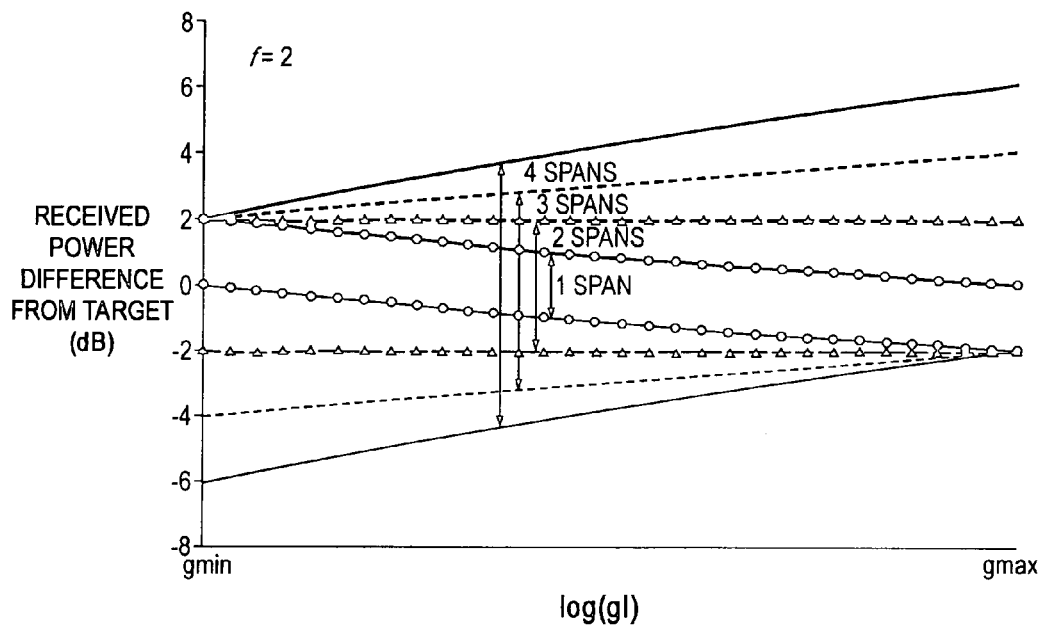
FIG. 6 is a plot of expected received power variation for light paths of various numbers of spans vs. gain variation based on a pre-emphasis factor of 2.
Figure 7:
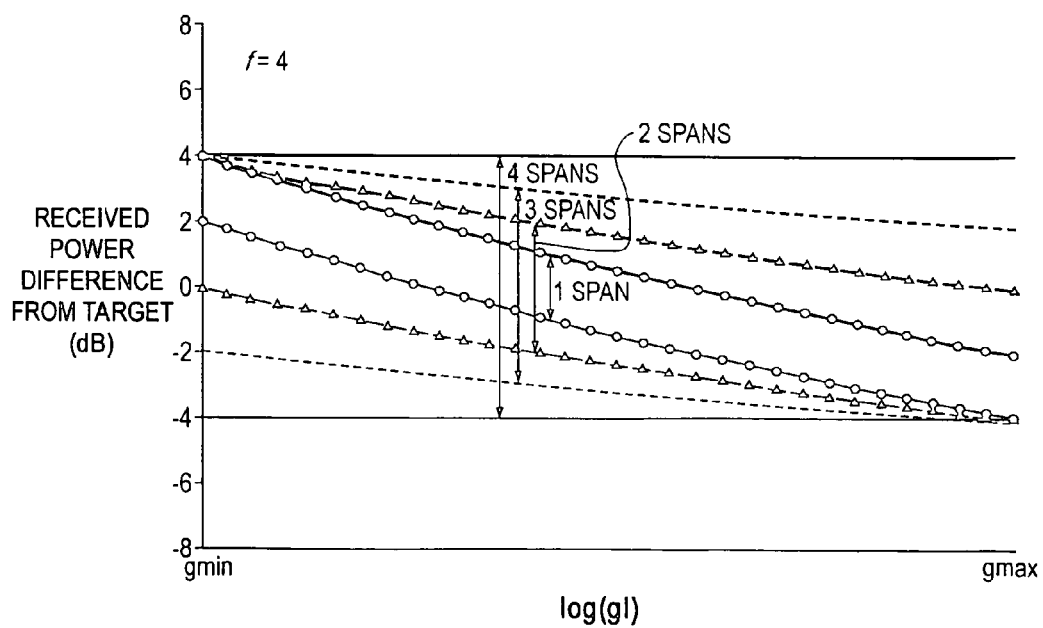
FIG. 7 is a plot of expected received power variation for light paths of various numbers of spans vs. gain variation based on a pre-emphasis factor of 4.

A fixed pre-emphasis factor f can be used, even though the network may contain light paths of various lengths. FIGS. 6 and 7 plot the received power variations under f=2 and f=4. In each plot, power variation range is plotted for light paths of various length, S=[1,2,3,4].

Let $S_{max}$ be the maximum length of the light paths in the network. Then the overall power variation range in the network is bounded by, $$-(2S_{max}-f) \leq \Delta P_{db}(\text{network}) \leq 2S_{max}-f.$$

Assigning f=$S_{max}$ will yield the smallest received power range. Setting the output power profile of module 30 in accordance with the inverse of the composite amplifier profile, based on FIG. 2, raised to the fourth power results in a module which can be used in conjunction with one, two, three or four spans without exceeding the receiver input ranges. Other exponents corresponding to larger numbers of spans can also be used.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A compensation process for a network comprising:
evaluating variations in amplifier gain over a selected range of wavelengths;
establishing an inverse function of the gain variations;
predetermining an output parameter of an optical transmitter in accordance with a corresponding value of the inverse function on a per wavelength basis including predetermining an output parameter for each one of a plurality of optical transmitters in accordance with a corresponding value of the inverse function selected from a plurality of corresponding wavelengths;
providing a plurality of lasers as optical transmitters;
setting a power output parameter for each member of the plurality of lasers in accordance with a corresponding value of the inverse function wherein the laser modules each have substantially the same power output profile and which includes providing pre-set laser modules for installation in a network where the number of optical spans between a module and a respective receiver is not larger than a predetermined exponent.

2. An optical network comprising:
a plurality of optical links;
a plurality of amplifiers coupled to respective links wherein at least some of the amplifiers exhibit common gain profiles;
a plurality of optical transmitters coupled to an input of a selected link; and
pre-emphasis adjustment circuitry coupled to the members of the plurality of transmitters whereby each transmitter's output power is predetermined in accordance with an inverse of the gain profile raised to a predetermined exponent wherein the pre-emphasis circuitry sets each transmitter's output power in accordance with the inverse gain profile, and
which includes an optical receiver coupled to an output of a respective optical link wherein less than S optical links extend between the plurality of transmitters and the receiver and wherein S does not exceed the value of the exponent,
the receiver has an input sensitivity range on the order of 2S dB.

3. An optical system comprising:
a plurality of communications links;
a plurality of add/drop elements between various members of the plurality of links, each of the elements including a pre-amplifier, the pre-amplifier having a common predetermined input range;
at least one pre-set pre-emphasis module located at one of the elements, the module establishes a predetermined gain profile, and couples a plurality of optical signals the gain of which is adjusted in accordance with the predetermined profile, to an input of one of the links associated with the one element, the module being usable to limit incoming optical signals to the predetermined input range when used with up to a predetermined number of optical links determined, at least in part, by the common input range and which includes a plurality of substantially identical, pre-set pre-emphasis modules.

4. A system as in claim 3 where the elements include at least one output amplifier with the pre-amplifier having a first common gain profile and the output amplifiers having a second common gain profile.

5. A system as in claim 4 where the pre-emphasis modules each incorporate channel based gain characteristics in accordance with an inverse of at least one of the common gain profiles.

6. A system as in claim 5 where the gain characteristics are in accordance with an inverse of both of the common gain profiles.

7. A system as in claim 4 where the gain characteristics of the modules are in accordance with an inverse of at least one of the common gain profiles raised to the predetermined number of optical links.

* * * * *